United States Patent
Van Beijnum et al.

(10) Patent No.: US 8,809,610 B2
(45) Date of Patent: Aug. 19, 2014

(54) PROCESS FOR PRODUCING PARAFFINIC HYDROCARBONS

(75) Inventors: Johannes Van Beijnum, Amsterdam (NL); Edward Julius Creyghton, Amsterdam (NL); Andries Hendrik Janssen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 756 days.

(21) Appl. No.: 13/000,388

(22) PCT Filed: Jun. 24, 2009

(86) PCT No.: PCT/EP2009/057918
§ 371 (c)(1),
(2), (4) Date: Mar. 23, 2011

(87) PCT Pub. No.: WO2009/156452
PCT Pub. Date: Dec. 30, 2009

(65) Prior Publication Data
US 2011/0166405 A1    Jul. 7, 2011

(30) Foreign Application Priority Data
Jun. 25, 2008 (EP) .................................. 08158917

(51) Int. Cl.
*C07C 1/207* (2006.01)

(52) U.S. Cl.
USPC .............. 585/733; 585/240; 585/734; 44/605

(58) Field of Classification Search
USPC ................. 585/240, 733–734; 208/133, 134, 208/136–138; 44/605
See application file for complete search history.

(56) References Cited

U.S. PATENT DOCUMENTS

| | | | | |
|---|---|---|---|---|
| 3,523,912 A | 8/1970 | Jaffe | | 252/439 |
| 4,159,937 A * | 7/1979 | Scott | | 208/104 |
| 4,992,605 A | 2/1991 | Craig et al. | | 585/240 |
| 5,705,722 A | 1/1998 | Monnier et al. | | 585/240 |
| 2005/0139514 A1* | 6/2005 | Miller | | 208/27 |

FOREIGN PATENT DOCUMENTS

| | | | | |
|---|---|---|---|---|
| EP | 1396531 | 3/2004 | | C10G 3/00 |
| FR | 2910017 | 6/2008 | | B01J 8/04 |
| WO | 2006100584 | 9/2006 | | |
| WO | WO2008058664 | 5/2008 | | C10G 45/62 |
| WO | WO2008101945 | 8/2008 | | C10L 1/08 |
| WO | WO2008113492 | 9/2008 | | C10L 1/08 |

OTHER PUBLICATIONS

Weisser, O. et al. (1973). Sulphide Catalysts, Their Properties and Applications, Pergamon Press, 506 pgs (Office action cites p. 19).*
Chen Xiangqian et al., "Production and Application of Alkyl Benzene", China Petrochemical Press,(1994), pp. 23-24 (translation provided).

* cited by examiner

Primary Examiner — Brian McCaig

(57) ABSTRACT

A process for producing paraffinic hydrocarbons from a feedstock comprising triglycerides, diglycerides, monoglycerides and/or fatty acids, the process comprising the following steps: (a) hydrode oxygenating the triglycerides, diglycerides, monoglycerides and/or fatty acids in the feedstock by contacting hydrogen and the feedstock with a hydrogenation catalyst at a temperature in the range of from 250 to 380° C. and a total pressure in the range of from 20 to 160 bar (absolute), to obtain an effluent comprising paraffinic hydrocarbons and water; (b) separating a liquid stream rich in paraffinic hydrocarbons from the effluent obtained in step (a); and (c) hydroisomerising the paraffinic hydrocarbons in the liquid stream rich in paraffinic hydrocarbons by contacting hydrogen and the liquid stream with a hydroprocessing catalyst comprising sulphided Ni and sulphided W or Mo as hydrogenation components on a carrier comprising amorphous silica-alumina and/or a zeolitic compound at a temperature in the range of from 280 to 450° C. and a total pressure in the range of from 20 to 160 bar (absolute).

10 Claims, 1 Drawing Sheet

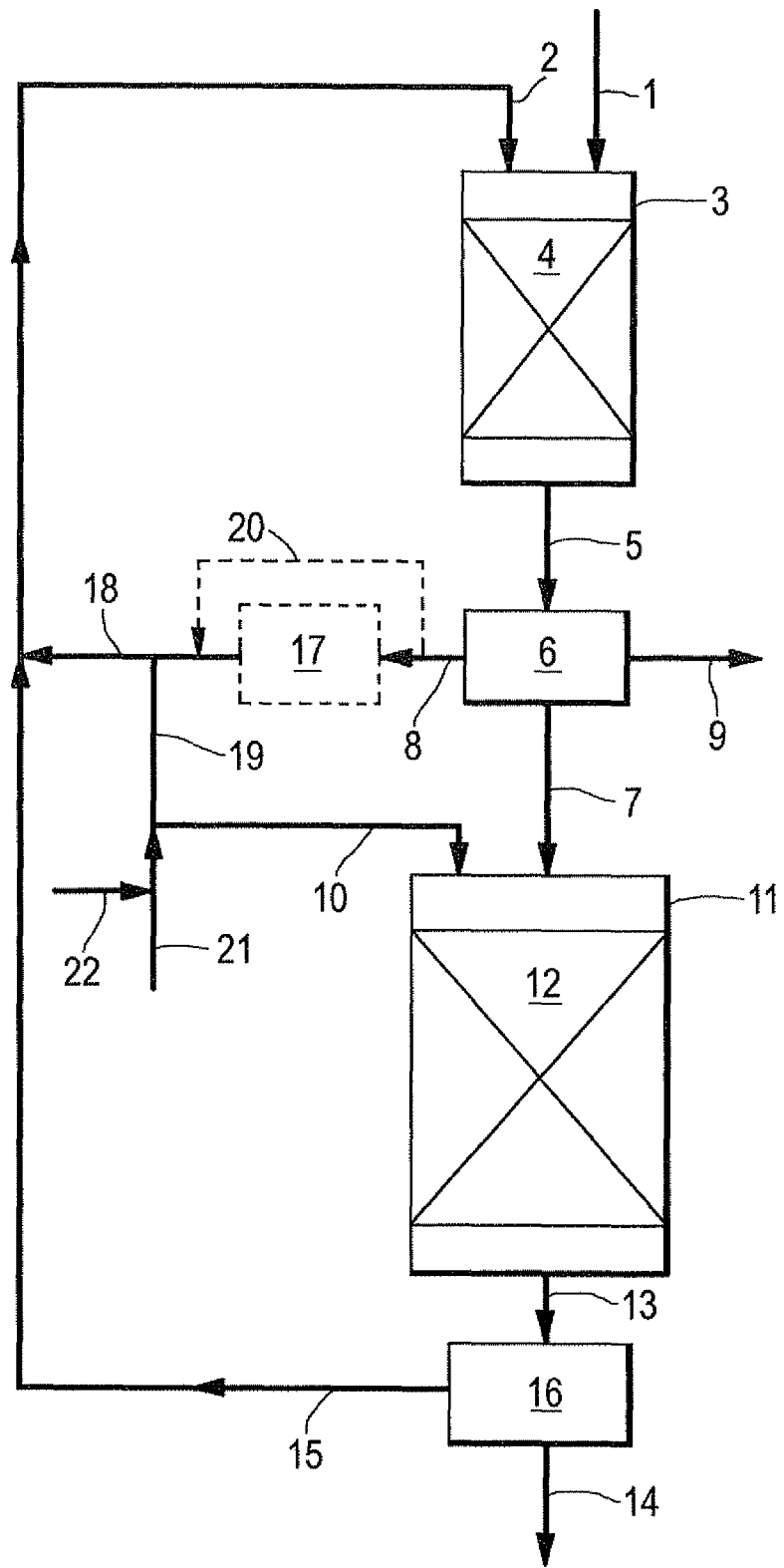

PROCESS FOR PRODUCING PARAFFINIC HYDROCARBONS

PRIORITY CLAIM

The present application claims priority of European Patent Application No. 08158917.8 filed Jun. 25, 2008.

FIELD OF THE INVENTION

The invention provides a process for producing paraffinic hydrocarbons from a feedstock comprising triglycerides, diglycerides, monoglycerides and/or fatty acids, in particular from vegetable oil, animal fat or fish oil.

BACKGROUND OF THE INVENTION

It is known that paraffinic hydrocarbons boiling in the diesel range may be produced from triglyceride-comprising feedstocks from biological origin such as vegetable oil, animal fat or fish oil.

In U.S. Pat. No. 4,992,605 for example is disclosed a process for producing hydrocarbon products in the diesel boiling range, mainly $C_{15}$-$C_{18}$ straight chain paraffins. The process comprises hydroprocessing vegetable oils or some fatty acids at conditions effective to cause hydrogenation, hydrotreating and hydrocracking of the feedstock (temperature 350-450° C.; pressure 4.8-15.2 MPa; liquid hourly space velocity 0.5-5.0 $hr^{-1}$) using a commercially available hydroprocessing catalyst. Cobalt-molybdenum and nickel-molybdenum hydroprocessing catalysts are mentioned as suitable catalysts. Co—Mo and Ni—Mo catalysts are exemplified in the examples. In the process of U.S. Pat. No. 4,992,605, straight chain paraffins are produced that have undesirable cold flow properties, i.e. a relatively high pour point and cloud point.

In U.S. Pat. No. 5,705,722 is disclosed a process for producing liquid hydrocarbons boiling in the diesel fuel range from a biomass feedstock comprising tall oil with a relatively high content of unsaturated compounds. The feedstock is hydroprocessed at a temperature of at least 350° C. Cobalt-molybdenum and nickel-molybdenum hydroprocessing catalysts are mentioned as suitable catalysts. Co—Mo and Ni—Mo catalysts are exemplified in the examples. Also in the process of U.S. Pat. No. 5,705,722, mainly normal alkanes are produced that have undesirable cold flow properties, i.e. a relatively high pour point and cloud point.

In EP 1 396 531 is disclosed a process for converting a feedstock selected from vegetable oil, animal fats or fish oil into liquid hydrocarbons, the process comprising a hydro-deoxygenation step followed by a hydro-isomerisation step. In this way, branched hydrocarbons with desirable cold flow properties are produced. The hydro-isomerisation step is operated using the counter-current flow principle. It is mentioned that for the hydro-deoxygenation step typically NiMo or CoMo catalyst are used. For the hydro-isomerisation step, the catalyst may comprise Pt, Pd or reduced Ni. Noble metal hydro-isomerisation catalysts (Pt or Pd) are preferred and exemplified. The feedstock is preferably pre-hydrogenated under mild conditions prior to the hydro-deoxygenation step.

In the process of EP 1 396 531, an expensive noble metal catalyst is used in the hydro-isomerisation step. Since noble metal catalysts are very sensitive to catalyst poisons, it is necessary to remove impurities from the effluent of the hydro-deoxygenation step. This is done by counter-current operation of the hydroisomerisation step and/or a stripping step between the hydro-deoxygenation and the hydro-isomerisation step.

In WO2008/058664 a process is disclosed for producing hydrocarbon fractions which can be used as diesel fuel or a component of diesel fuel, starting from a mixture of biological origin containing esters of fatty acids possibly with amounts of free fatty acids. The process disclosed in WO2008/058664 comprises a deoxygenation step with a hydrogenation catalyst, a purification step comprising separating a liquid fraction from step (a) and a washing step, and a hydroisomerisation step. The catalyst exemplified for the hydroisomerisation step comprises platinum on alumina, hence a noble metal catalyst sensitive to catalyst poisoning that requires the purification step.

SUMMARY OF THE INVENTION

It has now been found that a feedstock containing triglyceride, diglycerides, monoglycerides and/or fatty acids can be converted into paraffinic diesel components with excellent cold flow properties by applying a hydro-deoxygenation/hydro-isomerisation process wherein a hydroprocessing catalyst comprising sulphided Ni and sulphided W or Mo as hydrogenating components on an acidic catalyst carrier is used in the hydro-isomerisation step. By using a catalyst comprising sulphided Ni and sulphided W or Mo as hydrogenating components in the hydro-isomerisation step instead of a catalyst using a noble metal hydrogenating component, there is no need to completely remove impurities such as hydrogen sulphide, ammonia and water from the effluent of the hydro-deoxygenation step before it is contacted with the hydro-isomerisation catalyst. Removal of the greater part of the water appears to be sufficient for optimising the stability of the hydro-isomerisation catalyst.

Accordingly, the present invention provides a process for producing paraffinic hydrocarbons from a feedstock comprising triglycerides, diglycerides, monoglycerides and/or fatty acids, the process comprising the following steps:
(a) hydrodeoxygenating the triglycerides, diglycerides, monoglycerides and/or fatty acids in the feedstock by contacting hydrogen and the feedstock with a hydrogenation catalyst at a temperature in the range of from 250 to 380° C. and a total pressure in the range of from 20 to 160 bar (absolute), to obtain an effluent comprising paraffinic hydrocarbons and water;
(b) separating a liquid stream rich in paraffinic hydrocarbons from the effluent obtained in step (a); and
(c) hydroisomerising the paraffinic hydrocarbons in the liquid stream rich in paraffinic hydrocarbons by contacting hydrogen and the liquid stream with a hydroprocessing catalyst comprising sulphided Ni and sulphided W or Mo as hydrogenation components on a carrier comprising amorphous silica-alumina and/or a zeolitic compound at a temperature in the range of from 280 to 450° C. and a total pressure in the range of from 20 to 160 bar (absolute).

An important advantage of the process according to the invention is that no expensive noble metal catalyst is needed for the hydro-isomerisation step.

Since a catalyst comprising sulphided Ni and sulphided W or Mo is less sensitive to poisoning than the noble metal catalysts used in the hydro-isomerisation step of the prior art hydro-deoxygenation/hydro-isomerisation process, there is no need to completely remove impurities from the part of the hydro-deoxygenation effluent that is supplied to the hydro-isomerisation step and/or to operate the hydro-isomerisation step counter-currently.

The bulk of the water, i.e. typically at least 70%, that was present in the hydro-deoxygenation effluent is not present in the liquid stream that is supplied to hydro-isomerisation step (c). Depending on the temperature at which separation step (b) is carried out, the bulk of the water will either go to a gaseous stream (if step (b) is carried out at high temperature) or to a second liquid stream (if step (b) is carried out at low temperature).

Other impurities like hydrogen sulphide, ammonia, carbon oxides, light hydrocarbons and some water may to a certain extent remain in the liquid hydrocarbon-rich stream that is contacted with the hydroisomerisation catalyst without having negative effects on the catalyst.

BRIEF DESCRIPTION OF THE DRAWING

In the FIGURE is schematically shown a process scheme of one embodiment of the present invention, using a low temperature, high pressure separator in step (b).

DETAILED DESCRIPTION OF THE INVENTION

In the process according to the invention, hydrogen and a feedstock comprising triglycerides, diglycerides, monoglycerides and/or fatty acids are first contacted with a hydrogenation catalyst under hydro-deoxygenation conditions (step (a)). In hydrodeoxygenation step (a), triglycerides, diglycerides, monoglycerides and/or free fatty acids in the feedstock are converted into hydrocarbons, water and carbon oxides. The extent to which decarboxylation occurs depends on the hydrogenation catalyst used and the process conditions applied.

The hydro-deoxygenation conditions comprise a temperature in the range of from 250 to 380° C. and a pressure in the range of from 20 to 160 bar (absolute). Preferably, the hydro-deoxygenation temperature in step (a) is in the range of from 280 to 340° C. Reference herein to the hydro-deoxygenation temperature is to the maximum temperature that is occurring in hydro-deoxygenation step (a). Since the hydro-deoxygenation reaction is a strongly exothermic reaction, the temperature in the bottom part of the catalyst bed will typically be higher than the temperature in the upper part of the catalyst bed.

An effluent comprising paraffinic hydrocarbons and water is obtained in step (a). The effluent further comprises carbon oxides, unconverted hydrogen, and, if the feedstock comprises sulphur and/or nitrogen-containing compounds also hydrogen sulphide and/or ammonia.

Preferably, the hydrogenation catalyst comprises sulphided hydrogenation compounds, typically sulphided nickel or cobalt in combination with sulphided molybdenum or tungsten. In case of such sulphided hydrogenation catalyst, a sulphur source will typically be supplied to the hydrogenation catalyst in order to keep the catalyst in sulphided form during hydrodeoxygenation step (a). As a consequence, the effluent of step (a) then comprises hydrogen sulphide.

The hydrogenation catalyst of step (a) may be any hydrogenation catalyst known in the art that is suitable for hydro-deoxygenation, typically a catalyst comprising metals of Group VIII and/or Group VIE of the Periodic Table of Elements or compounds thereof. Examples of such catalysts are catalysts comprising Pd, Pt, reduced Ni, or sulphided CoMo, NiMo or NiW as hydrogenation components on a carrier. The carrier typically comprises a refractory oxide, preferably alumina, amorphous silica-alumina, titania or silica. The carrier may comprise a zeolitic compound.

If a catalyst comprising sulphided CoMo, NiMo or NiW is used, the catalyst may be sulphided in-situ or ex-situ. In-situ sulphiding may be achieved by supplying a sulphur source, usually hydrogen sulphide or a hydrogen sulphide precursor, i.e. a compound that easily decomposes into hydrogen sulphide such as for example dimethyl disulphide, di-tert-nonyl polysulphide or di-tert-butyl polysulphide, to the catalyst of step (a) during operation of the process. The sulphur source may be supplied with the feedstock, the hydrogen or separately. An alternative suitable sulphur source is a sulphur-comprising hydrocarbon stream boiling in the diesel or kerosene boiling range that is be co-fed with the feedstock. Preferably, an amount of in the range of from 100 to 5,000 ppmv hydrogen sulphide, more preferably of from 500 to 1,000 ppmv, or an equivalent amount of a hydrogen sulphide precursor, based on the volume of hydrogen supplied, is supplied to step (a).

In separation step (b), a liquid stream rich in paraffinic hydrocarbons is separated from the effluent obtained in step (a). Preferably, separation step (b) is carried out at a high pressure, i.e. a pressure in the range of from 0.5 to 10 bar lower, preferably of from 1 to 5 bar lower, than the pressure at the outlet of the reactor vessel in which step (a) is carried out.

Step (b) may be carried out in a low temperature, high pressure separator to separate a gaseous stream depleted in water, a liquid water-rich stream and the liquid stream rich in paraffinic hydrocarbons from the effluent obtained in step (a). Low temperature, high pressure separators are known in the art. In the low temperature, high pressure separator, the effluent of step (a) is first cooled, preferably to a temperature in the range of from 10 to 150° C., and the cooled effluent is then, in a separation vessel, separated into a gaseous phase depleted in water and a liquid phase. Due to a difference in density, the liquid phase separates into a water-rich liquid phase and hydrocarbon-rich liquid phase. The pressure in the separation vessel is preferably in the range of from 0.5 to 10 bar lower, more preferably in the range of from 1 to 5 bar lower, than the total pressure at the outlet of the reactor vessel wherein step (a) is carried out.

The gaseous stream depleted in water obtained in the low temperature, high pressure separator of step (b) may be recycled, optionally after removal of impurities like hydrogen sulphide, ammonia, carbon oxides, light hydrocarbons or steam, to step (a) and/or step (c) to provide part of the hydrogen needed in step (a) and/or step (c).

Alternatively, step (b) may be carried out in a high temperature, high pressure separator to separate a gaseous stream rich in water and the liquid stream rich in paraffinic hydrocarbons from the effluent obtained in step (a). High temperature, high pressure separators are known in the art. It will be appreciated that the temperature in the high temperature, high pressure separator is chosen such that there is sufficient separation between water and paraffinic hydrocarbons whilst the temperature is as little as possible below the inlet temperature of hydroisomerisation step (c). Typically, the temperature in the high temperature, high pressure separator is in the range of from 160 to 350° C., usually of from 180 to 320° C. The gaseous stream rich in water will contain the major part of the water that was present in the effluent of step (a). If the gaseous stream is to be recycled to step (a) and/or step (c), it is therefore preferred that water is removed from it prior to recycling. Water removal from the gaseous stream rich in water is suitably done in a low temperature, high pressure separator. Thus, a gaseous stream depleted in water is obtained that may be recycled, optionally after removal of impurities like hydrogen sulphide, ammonia, carbon oxides, light hydrocarbons or steam, to step (a) and/or step (c) to provide part of the hydrogen needed in step (a) and/or step (c).

The liquid stream rich in paraffinic hydrocarbons obtained in separation step (b) is hydroisomerised in step (c). Preferably, the liquid stream comprises less than 30 wt %, more preferably less than 10 wt %, even more preferably less than 5 wt %, of the water comprised in the effluent of step (a). The liquid stream may further comprise impurities like propane, dissolved hydrogen sulphide, and carbon oxides. It will be appreciated that the lower the temperature in separation step (b), the higher the amount of low-molecular weight compounds dissolved in the liquid stream rich in paraffinic hydrocarbons.

In hydroisomerisation step (c), the paraffinic hydrocarbons in the liquid stream rich in paraffinic hydrocarbons are hydroisomerised by contacting hydrogen and the liquid stream with a hydroprocessing catalyst comprising sulphided Ni and sulphided W or Mo as hydrogenation components on a carrier comprising amorphous silica-alumina and/or a zeolitic compound at a temperature in the range of from 280 to 450° C. and a total pressure in the range of from 20 to 160 bar (absolute). Preferably, the hydro-isomerisation temperature is in the range of from 300 to 400° C., more preferably of from 330 to 380° C.

The total pressure in each of steps (a) and (c) is preferably in the range of from 40 to 120 bar (absolute), more preferable of from 50 to 80 bar (absolute). Reference herein to the total pressure of a conversion step is to the pressure at the outlet of the reactor vessel comprising the catalyst for that step.

The hydroprocessing catalyst of step (c) comprises sulphided Ni and sulphided W or Mo as hydrogenation components on a carrier comprising amorphous silica-alumina and/or a zeolitic compound. Such catalysts and their preparation are well-known in the art. Preferably, the catalyst of step (c) comprises sulphided Ni and sulphided W. The catalyst may comprise sulphided Ni, W and Mo (sulphided NiMoW catalyst). The hydroprocessing catalyst of step (c) may be sulphided in-situ or ex-situ in the same way as described above for step (a). In case only in step (c) a sulphided catalyst is used, the sulphur source is preferably supplied to the catalyst bed of step (c).

The catalyst of step (c) may comprise a zeolitic compound. Any acidic zeolitic compound having hydro-isomerising activity may suitably be used. Such zeolitic compounds are known in the art. Examples of such zeolitic compounds include, but are not limited to, zeolite Y, zeolite beta, ZSM-5, ZSM-12, ZSM-22, ZSM-23, ZSM-48, SAPO-11, SAPO-41, and ferrierite.

The gaseous stream depleted in water that is directly or indirectly separated from the effluent of step (a) is preferably recycled to step (a) and/or (c) to provide for the hydrogen needed for the hydrodeoxygenation and/or hydroisomerisation reaction. Additional fresh hydrogen may be supplied to step (a) and/or (c). The gaseous stream may be directly supplied to step (a) and/or (c), i.e. without further purification steps to remove components other than hydrogen, for example carbon oxides, propane, steam, or hydrogen sulphide. In order to prevent excessive built-up of inerts, preferably, at least part of the carbon oxides is removed from the gaseous stream before recycling to step (a) and/or (c).

Removal of components other than hydrogen from the gaseous stream depleted in water may be done by any suitable techniques known in the art, for example by pressure swing adsorption or amine scrubbing.

Preferably, the gaseous stream depleted in water is purified in a purification unit before being recycled to step (a) and/or step (c), more preferably in a pressure swing absorber or an amine scrubber.

In each of steps (a) and (c), the catalyst is typically arranged in the form of a single catalyst bed or two or more catalyst beds in series. Step (a) and (c) are each carried out in a separate reactor vessel. Preferably, the catalyst bed(s) for each of steps (a) and (c) are contained in a single reactor vessel. If step (a) or step (c) comprises two or more catalyst beds in series, each of the catalyst beds may be in a separate reactor vessel.

Both in step (a) and in step (c), the liquid stream, i.e. the feedstock in step (a) and the liquid stream rich in paraffinic hydrocarbons in step (c), and hydrogen are preferably co-currently contacted with the catalyst.

In order to control the temperature increase over the catalyst bed of step (a), staged supply of feedstock and/or of hydrogen may be applied. An alternative way to control the temperature increase over the catalyst bed is to dilute the feedstock supplied to step (a), preferably by recycling part of the liquid stream rich in paraffinic hydrocarbons obtained in step (b) to step (a).

The ratio of hydrogen-to-feed supplied to the catalyst of step (a) is typically in the range of from 200 to 10,000 normal liters (NL), i.e. liters at standard conditions of T and p (0° C. and 1 atm.) per kilogram feed, preferably of from 500 to 8,000 NL/kg, more preferably of from 800 to 3,000 NL/kg. Reference herein to feed is to the total of feedstock and diluent, i.e. to the total of feedstock and liquid recycle if the feedstock is diluted with a liquid recycle stream.

The feed is typically supplied to the catalyst of step (a) at a weight hourly space velocity (WHSV) in the range of from 0.1 to 10 kg feed per liter catalyst per hour, preferably of from 0.2 to 5.0 kg/L·hr, more preferable of from 0.5 to 3.0 kg/L·hr. The WHSV in hydro-isomerisation step (c) is preferably in the range of from 0.1 to 2.0 kg feed per liter catalyst per hour, more preferably of from 0.5 to 1.0 kg/L·hr. Since the WHSV in step (c) is preferably lower than in step (a), the catalyst bed of step (c) is preferably larger than the catalyst bed of step (a). Reference herein to the WHSV for step (c) is to the weight of liquid stream rich in paraffinic hydrocarbons per liter catalyst of step (c) per hour.

Additional hydrogen may be added to the catalyst of step (c) for the purpose of quenching (cooling) or for supplying heat to step (c).

If step (c) is co-currently operated, the effluent of step (c) is preferably separated into a gaseous effluent comprising hydrogen, carbon oxides, steam and light hydrocarbons, and a liquid effluent. Hydrogen from the gaseous effluent, preferably after removal of the other components, is preferably recycled to step (a) and/or step (c). The liquid effluent comprises paraffinic hydrocarbons boiling in the diesel range and may suitably be used in a diesel fuel. Part of the liquid effluent may be recycled to step (a) and/or step (c) to help control the exothermic temperature increase.

The feedstock comprises triglycerides, diglycerides, monoglycerides and/or fatty acids. Preferably, the feedstock comprises triglycerides, more preferably at least 40 wt % triglycerides, even more preferably at least 60 wt %. Suitably, the feedstock comprises vegetable oil, animal fat or fish oil to provide for the triglycerides. Preferably, the feedstock is vegetable oil, animal fat or fish oil. Mixtures of the vegetable oils, animal fats, fish oils, and mixtures which include vegetable oil, animal fat and/or fish oil may be used. Preferably, the vegetable oil, animal fat or fish oil is in anhydrous or refined form. The oil or fat may contain free fatty acids and/or monoesters of fatty acids (monoglycerides) and other compounds that naturally occur in the oil or fat, for example carotenoids, phosphatides, terpenes, sterols, fatty alcohols, tocopherols, polyisoprene, carbohydrates and proteins.

Suitable vegetable oils include rapeseed oil, palm oil, coconut oil, corn oil, soy oil, safflower oil, sunflower oil, linseed oil, olive oil and peanut oil. Suitable animal fats include pork lard, beef fat, mutton fat and chicken fat. Particularly preferred feedstocks are rapeseed oil and palm oil, in particular palm oil. It has been found that particularly the use of palm oil results in good cold flow properties of the paraffinic hydrocarbons obtained.

The feedstock may be subjected to a pre-hydrogenation step prior to hydrogenation step (a) for saturation of double bonds in the fatty acid chains of the glycerides and free fatty acids. Pre-hydrogenation will reduce side reactions of the double bonds such as polymerisation, ring formation and aromatisation. In such pre-hydrogenation step, the feedstock is contacted in the presence of hydrogen with a hydrogenation catalyst, typically under milder conditions than the hydrodeoxygenation conditions of step (a). The pre-hydrogenation catalyst may be any hydrogenation catalyst known in the art, preferably a catalyst comprising sulphided Ni or Co and sulphided W or Mo.

Preferably, the glyceride- and/or free fatty acid-containing feedstock that is supplied to step (a) is pre-heated to a temperature of at most 320° C. Above 320° C., thermal degradation may occur.

Detailed Description of The Drawing

In the FIGURE is schematically shown a process scheme of one embodiment of the present invention. Heat exchangers and compressors are not shown.

A stream of vegetable oil 1 and a gaseous stream 2 comprising hydrogen are supplied to reactor vessel 3 comprising catalyst bed 4 containing a sulphided hydrogenation catalyst. In catalyst bed 4, vegetable oil 1 is hydrodeoxygenated and an effluent 5 comprising paraffinic hydrocarbons and water is obtained. Effluent 5 is supplied to low temperature high pressure separator 6 and is separated into a liquid stream 7 rich in paraffinic hydrocarbons, a gaseous stream 8 depleted in water, and a liquid water-rich stream 9. Liquid stream 7 and a hydrogen-rich gaseous stream 10 are supplied to reactor vessel 11 containing catalyst bed 12 containing a sulphided NiW hydroprocessing catalyst. In catalyst bed 12, liquid stream 7 is hydro-isomerised and an effluent 13 is obtained that is separated into a liquid product stream 14 and a gaseous stream 15 in separator 16. Gaseous stream 8 depleted in water is recycled, optionally after purification in pressure swing adsorption unit 17, to catalyst beds 4 and 12 as streams 18 and 19, respectively. If gaseous stream 8 is purified prior to recycling to catalysts beds 4 and/or 12, part 20 of stream 8 may bypass pressure swing adsorption unit 17 in order to minimise hydrogen losses.

Make-up hydrogen 21 is mixed with gaseous recycle stream 19 and supplied to catalyst bed 12 as hydrogen-rich gaseous stream 10. In order to provide for the hydrogen sulphide needed to keep the catalysts in beds 4 and 12 in sulphided form, hydrogen stream 21 is spiked with a gaseous hydrogen sulphide precursor 22, for example dimethyl disulphide. Alternatively, a gaseous hydrogen sulphide precursor may be added to gaseous stream 2, i.e. the hydrogen-containing gaseous stream that is supplied to hydrodeoxygenation catalyst bed 4, or to both streams 21 and 2.

Gaseous stream 15 obtained after separation of effluent 13 of the hydro-isomerisation step is mixed with recycle stream 18 to be recycled to catalyst bed 4 of the hydrodeoxygenation step as gaseous stream 2 comprising hydrogen.

EXAMPLE

The invention will be further illustrated by means of the following non-limiting example.

Refined palm oil was, in a first reactor, hydrodeoxygenated over a bed of sulphided hydrogenation catalyst. The effluent of the first reactor was separated into a liquid stream rich in paraffinic hydrocarbons and a gaseous stream in a high temperature, high pressure separator. The liquid stream rich in paraffinic hydrocarbons had a water content of 20 mg/kg (20 ppmw) and was fed at a weight hourly space velocity of 1.0 kg oil per liter catalyst per hour to a second reactor containing a catalyst bed with 75 mL hydro-isomerisation catalyst (5 wt % NiO and 21 wt % $W_2O_3$ on amorphous silica-alumina) and 75 mL silicon carbide spheres. A stream of pure hydrogen was supplied to the second reactor at a rate of 1,500 NL hydrogen per kg liquid stream. In order to keep the hydro-isomerisation catalyst in sulphided form, di-tert-butyl polysulphide in an amount equivalent to 5000 ppm sulphur based on the weight of hydrocarbons was added to the liquid stream rich in paraffinic hydrocarbons before it was fed to the second reactor.

The temperature of the catalyst bed in the second reactor was maintained at 365° C. by means of an oven. The total pressure in the second reactor was 51 bar (absolute).

The cloud point and pour point of the liquid effluent of the second reactor were determined according to ASTM D 2500 and ASTM D 97, respectively. The liquid effluent had a cloud point of −30° C. and a pour point of −35° C. The weight percentage of branched paraffins in the liquid effluent was 56.3%.

We claim:

1. A process for producing paraffinic hydrocarbons from a feedstock comprising triglycerides, diglycerides, monoglycerides and/or fatty acids, the process:
   (a) hydrodeoxygenating the triglycerides, diglycerides, monoglycerides and/or fatty acids in the feedstock by contacting hydrogen and the feedstock with a hydrogenation catalyst at a temperature in the range of from 250 to 380° C. and a total pressure in the range of from 20 to 160 bar (absolute), to obtain an effluent comprising paraffinic hydrocarbons and water;
   (b) obtaining a liquid stream rich in paraffinic hydrocarbons and a gaseous stream depleted in water from the effluent obtained in step (a); and
   (c) hydroisomerising the paraffinic hydrocarbons in the liquid stream rich in paraffinic hydrocarbons by contacting hydrogen and the liquid stream with a hydroprocessing catalyst comprising sulphided Ni and sulphided W or Mo as hydrogenation components on a carrier comprising amorphous silica-alumina and/or a zeolitic compound at a temperature in the range of from 280 to 450° C. and a total pressure in the range of from 20 to 160 bar (absolute)
   wherein the gaseous stream depleted in water is recycled to step (a) and/or step (c);
   wherein at least part of the gaseous stream depleted in water is purified in a purification unit before being recycled to step (a) and/or step (c); and
   wherein the purification unit is a pressure swing adsorber and part of the gaseous stream depleted in water is bypassing the pressure swing adsorber.

2. The process of claim 1 wherein step (b) comprises cooling the effluent obtained in step (a) to a temperature in a range of 10 to 150 degrees C. and subjecting the cooled effluent to a pressure in a range of 0.5 to 10 bar lower than the total pressure in step (a) to obtain the gaseous stream depleted in water and the liquid stream rich in paraffinic hydrocarbons.

3. The process of claim 1 wherein obtaining the liquid stream rich in paraffinic hydrocarbons comprises separating the liquid stream rich in paraffinic hydrocarbons and a gaseous stream rich in water from the effluent obtained in step (a) in a separator having a temperature in a range of 160 to 350 degrees C. and a pressure in a range of 0.5 to 10 bar lower than the total pressure of an outlet of a reactor vessel in which step (a) is carried out.

4. The process of claim 3 wherein obtaining the gaseous stream depleted in water comprises removing water from the gaseous stream rich in water in a separator having a temperature in a range of 10 to 150 degrees C. and a pressure in a range of 0.5 to 10 bar lower than the total pressure of an outlet of a reactor vessel in which step (a) is carried out.

5. The process of claim 1 wherein the hydrogenation catalyst of step (a) is a sulfided catalyst.

6. The process of claim 5 wherein a sulfur source is supplied to the hydrogenation catalyst and the effluent of step (a) further comprises hydrogen sulfide.

7. The process of claim 1 wherein the feedstock comprises vegetable oil, animal fat, fish oil, or a combination of one or more thereof.

8. The process of claim 7 wherein the feedstock comprises one or more vegetable oils.

9. The process of claim 7 wherein the one or more vegetable oils is rape seed oil and/or palm oil.

10. The process of claim 1 wherein the effluent of step (c) is separated into a gaseous effluent and a liquid effluent comprising paraffinic hydrocarbons boiling in the diesel range.

\* \* \* \* \*